(12) United States Patent
Hoglund et al.

(10) Patent No.: US 7,132,059 B2
(45) Date of Patent: Nov. 7, 2006

(54) AMBIENT APPLIED DESICCANT MATRIX COMPOSITION

(75) Inventors: Heidi J. Hoglund, St. Paul, MN (US); Mai T. Nguyen-Misra, Shoreview, MN (US)

(73) Assignee: H.B. Fuller Licensing & Financing, Inc., St. Paul, MN (US)

( * ) Notice: Subject to any disclaimer, the term of this patent is extended or adjusted under 35 U.S.C. 154(b) by 162 days.

(21) Appl. No.: 10/446,439

(22) Filed: May 29, 2003

(65) Prior Publication Data

US 2004/0238788 A1    Dec. 2, 2004

(51) Int. Cl.
C09K 3/00 (2006.01)
C08K 5/09 (2006.01)
C08K 3/34 (2006.01)

(52) U.S. Cl. .............. 252/194; 524/296; 524/394; 524/442; 524/445; 524/450

(58) Field of Classification Search ......... 524/296, 524/394, 442, 445, 571, 572, 450; 252/194; 52/172, 786.13
See application file for complete search history.

(56) References Cited

U.S. PATENT DOCUMENTS

| | | | |
|---|---|---|---|
| 4,215,164 A | | 7/1980 | Bowser |
| 4,313,916 A | | 2/1982 | Jones, Jr. et al. |
| 4,390,678 A | | 6/1983 | LaBelle et al. |
| 4,405,752 A | * | 9/1983 | Recker et al. ........... 524/847 |
| 4,593,068 A | * | 6/1986 | Hirose et al. ........... 525/100 |
| 4,622,249 A | * | 11/1986 | Bowser ................. 428/34 |
| 4,866,120 A | * | 9/1989 | Rudnick et al. ......... 524/849 |
| 5,177,916 A | | 1/1993 | Misera et al. |
| 5,264,148 A | | 11/1993 | Chou et al. |
| 5,304,623 A | | 4/1994 | Ito et al. |
| 5,313,761 A | | 5/1994 | Leopold |
| 5,319,008 A | * | 6/1994 | Janoski ................. 524/59 |
| 5,459,185 A | * | 10/1995 | Nakata et al. .......... 524/227 |
| 5,531,047 A | | 7/1996 | Leopold et al. |
| 5,653,073 A | | 8/1997 | Palmer |
| 5,863,857 A | | 1/1999 | Lamb et al. |
| 5,897,946 A | * | 4/1999 | Nachtman et al. ...... 428/323 |
| 5,990,205 A | | 11/1999 | Cordova |
| 6,046,243 A | | 4/2000 | Wellinghoff et al. |
| 6,055,783 A | | 5/2000 | Guhl et al. |
| 6,136,446 A | | 10/2000 | Virnelson et al. |
| 6,136,910 A | | 10/2000 | Virnelson et al. |
| 6,212,756 B1 | | 4/2001 | Ferri |
| 6,223,414 B1 | | 5/2001 | Hodek et al. |
| 6,286,288 B1 | | 9/2001 | France |
| 6,355,328 B1 | | 3/2002 | Baratuci et al. |
| 6,401,428 B1 | | 6/2002 | Glover et al. |
| 6,463,706 B1 | | 10/2002 | Guhl et al. |
| 6,686,002 B1 | * | 2/2004 | Auerbach ............... 428/34 |
| 6,777,481 B1 | | 8/2004 | Chu |
| 2001/0014707 A1 | | 8/2001 | Thomas et al. |
| 2002/0123575 A1 | * | 9/2002 | Kato et al. ............. 525/390 |

FOREIGN PATENT DOCUMENTS

EP    192363 A  *  8/1986

OTHER PUBLICATIONS

Wypych, George. Handbook of Fillers, 2nd Edition. Toronto, Plastics Design Library, 2000, p. 321. TP1114.W96.*

Crystal Structure, pp. 6, 7 and Performance Characteristics, pp. 10, 11, (4 pages), undated.

"Poly bd Resins", General Bulletin, Elf Atochem, (8 pages), Apr. 1996.

"Claytone Chemistry", Terry W. Pierce, Southern Clay Products, Gonzales, Texas, (15 pages), undated.

* cited by examiner

*Primary Examiner*—Vasu Jagannathan
*Assistant Examiner*—Vickey Ronesi

(57) ABSTRACT

A desiccating matrix composition that includes hydrogen-bonding polymer, plasticizer, organic-modified clay, adsorbent and optionally metal stearate.

21 Claims, No Drawings

AMBIENT APPLIED DESICCANT MATRIX COMPOSITION

BACKGROUND

The invention relates to applying a desiccant matrix under ambient conditions.

Desiccants are often present in the sealed chamber of an insulating glass assembly to reduce or eliminate the accumulation and condensation of fog on the interior surfaces of the sealed chamber. The presence of fog within the chamber of the assembly can result from moisture and organic volatile compounds that are either present in the chamber or given off by organic components that are present in the sealed chamber. Insulating glass assemblies generally include at least two panes of glass separated by a spacing structure and a desiccant disposed on the spacing structure or in a channel defined by the spacing structure.

Desiccants are available in various forms including loose adsorbent particles and matrix compositions that include a carrier and an adsorbent. Various classes of desiccant matrix compositions are available including hot melt and moisture curable desiccant matrix compositions. Hot melt desiccating matrices are heated to elevated temperatures to render them sufficiently flowable or pumpable for application to the spacing structure. Hot melt desiccant matrices require special equipment for application and relatively high temperatures.

Moisture curable desiccating matrices can be applied at room temperature but must undergo a curing reaction to achieve a sufficiently solid state such that phase separation does not occur. The lack of complete cure can result in products having defects.

SUMMARY

The invention features a desiccating matrix composition that includes hydroxy-functional polybutadiene, plasticizer, metal stearate, organic-modified clay, and adsorbent. In one embodiment, the desiccating matrix composition exhibits a flow rate of from about 80 seconds to about 300 seconds. In some embodiments, the composition includes from about 5% by weight to about 40% by weight the hydroxyl-functional polybutadiene, from about 5% by weight to about 30% by weight the plasticizer, and from about 0.1% by weight to 3% by weight the metal stearate. In other embodiments, the composition includes from 20% by weight to 80% by weight the adsorbent.

In one embodiment, the composition includes from about 0.1% by weight to about 3% by weight the clay.

In some embodiments, the composition exhibits no greater than 1 centimeter of liquid migration at room temperature. In other embodiments, the composition is free of visible liquid migration at room temperature. In one embodiment, the composition exhibits no greater than 2 centimeters of slump. In some embodiments, the composition exhibits no greater than 0.25 centimeters of slump.

In another embodiment, the metal stearate is selected from the group including lithium stearate, calcium stearate, zinc stearate, and combinations thereof. In other embodiments, the metal stearate includes aluminum stearate.

In some embodiments, the plasticizer includes phthalate ester. In other embodiments, the plasticizer includes trimelitate plasticizer.

In one embodiment, the organic-modified clay includes hydroxyl groups.

In some embodiments the composition further includes calcium carbonate, pigment, antioxidant, ultraviolet light stabilizer, or a combination thereof.

In another embodiment, the adsorbent particles are capable of adsorbing moisture, volatile organic compounds or a combination thereof.

In another embodiment, the desiccating matrix composition includes hydroxyl-functional polymer, plasticizer, organic-modified clay, and adsorbent. In one embodiment, the hydroxyl-functional polymer is selected from the group consisting of polyetherpolyol and hydroxyl-functional polybutadiene.

In other aspects, the invention features an insulating glass assembly that includes a spacing structure, a first pane of glass bonded to a first surface of the spacing structure, a second pane of glass bonded to the spacing structure, and a desiccant composition described herein disposed on the spacing structure. In one embodiment, the insulating glass assembly is free of visible fog when tested according to ASTM E1887-97. In some embodiments, the insulating glass assembly passes the Class C performance requirements of ASTM E774/773, the Class CB performance requirements of ASTM E774/773, or even the Class CBA performance requirements of ASTM E774/773.

In another aspect, the invention features a method of applying a desiccant matrix composition, the method including contacting a spacing structure with the desiccant matrix composition according to the present invention at a temperature from about 15° C. to about 35° C.

The invention features a desiccant matrix composition that can be applied at room temperature that exhibits good sag resistance, flow resistance and liquid phase retention. The composition emits low levels, or even no, volatile organic compounds.

Other features and advantages will be apparent from the following description of the preferred embodiments and from the claims.

DETAILED DESCRIPTION

The desiccant matrix composition includes hydrogen-bonding polymer (i.e., polymer with functional groups capable of hydrogen-bonding) plasticizer, metal stearate, adsorbent and organic-modified clay and can be applied at ambient temperature (i.e., from about 15° C. to about 35° C.). The composition is preferably free of components that volatilize at a temperature less than 190° F. The desiccant matrix composition exhibits a flow rate of from about 80 second to about 300 seconds, or even 120 second to about 180 seconds.

The composition preferably remains in place when applied to a substrate and is free of visible sag or slump. Preferably the composition exhibits a slump of no greater than 0.25 inch, no greater than 0.10 inch, or even no greater than 0.05 inch, at room temperature. The composition also preferably exhibits a slump of no greater than 0.3 inch, or even no greater than 0.1 inch, after one week at 190° F., or even after two weeks at 190° F.

The liquid components and the solid components of the desiccant matrix composition exhibit little to no physical phase separation. One measure of physical phase separation is liquid migration resistance. The composition preferably exhibits a liquid migration of no greater than 2 mm, or even is free of liquid migration, at room temperature, after two months at room temperature, or even after one year at room temperature.

Suitable hydrogen-bonding polymers include, e.g., hydroxy-functional polymers, amine-functional polymers, carboxyl functional polymers, and maleinized polymers. The hydrogen-bonding polymer preferably has a functionality of at least 2 or converts to a polymer having at least 2 functional groups upon exposure to moisture. A preferred hydroxy-functional polymer is hydroxyl terminated polybutadiene. Useful hydroxyl terminated polybutadienes are commercially available under the POLY BD series of trade designations including R-45HT, R-45M, R-20LM, 600 and 605 from Elf Atochem North America Inc. (Philadelphia, Pa.). Another suitable class of hydroxy-functional polymers is polyetherpolyols. Useful polyetherpolyols are available under the ACCLAIM and BAYCOLL trade designations from Bayer (Pittsburgh, Pa.), POLY-G from Arch (Brandenburg, Ky.) and VORANOL from Dow Chemical Company (Midland, Mich.).

Useful amine-functional polymers include polyether diamines commercially available, e.g., under the JEFFAMINE D and ED trade designations from Huntsman (Houston, Tex.).

Useful maleinized polymers include maleinized polybutadienes, which are commercially available, e.g., under the RICON 130 MA8 and 131 MA5 trade designations from Elf Atochem North America, Inc. (Philadelphia, Pa.).

Hydrogen-bonding polymer is preferably present in the composition in an amount from about 5% by weight to about 40% by weight, or even from 10% by weight to 35% by weight.

Suitable metal stearates include, e.g., aluminum stearate, lithium stearate, calcium stearate and zinc stearate. Useful metal stearates are available under the trade designation SYNPRO from Ferro (Walton Hills, Ohio). The composition preferably includes from 0.1% by weight to 3% by weight, from 0.5% by weight to 2% by weight, or even 0.5% to 1.5% by weight metal stearate.

The plasticizer preferably has low volatility, or even no volatility, and has low vapor pressure, or even no measurable vapor pressure. Useful plasticizers include, e.g., phthalate esters, trimellitates and combinations thereof. Examples of useful phthalate esters include diisononyl phthalate, diisodecyl phthalate, ditridecyl phthalate, and mixtures thereof. Useful phthalate ester plasticizers are commercially available under the trade designation JAYFLEX DTDP ditridecylphthalate from ExxonMobil (Houston, Tex.) and SANTICIZER phthalate plasticizer from Ferro. One example of a useful trimellitate is triisononyl trimellitate, which is commercially available under the trade designation JAYFLEX TINTM from ExxonMobil (Houston Tex.). Plasticizer is preferably present in the composition in an amount from 5% by weight to 30% by weight plasticizer, from 10% by weight to 25% by weight, or even from about 10% by weight to 20% by weight.

The organic-modified clay includes a base clay component and organic groups attached to the base clay component. Useful base clays include, e.g., smectite (e.g., montmorillonite and hectorite). Suitable organic groups include those organic groups attached to the base clay through reaction with quaternary ammonium chloride. Preferably the organic-modified clay includes hydroxyl groups. Suitable organic modified clays are commercially available under the CLAYTONE trade designation from Southern Clay Products (Gonzales, Tex.). Organic-modified clay is preferably present in the composition in an amount from 0.1% by weight to 3% by weight clay, from 0.5% by weight to 2% by weight clay, or even from about 0.5% by weight to 1.5% by weight.

The adsorbent is capable of adsorbing molecules present in the atmosphere to which the adsorbent is exposed including, e.g., moisture, low molecular weight organic compounds (i.e., volatile organic compounds), and combinations thereof. Preferably the adsorbent is an inorganic particulate (e.g., powder). The adsorbent preferably has a particle size no greater than 10 microns, or even no greater than 5 microns. Useful adsorbents include natural zeolite (e.g. chabasite, gumerinite, levynite, erinite, mordenite and analcite), molecular sieves (e.g., alkali metal alumino-silicates), silica gel, silica-magnesia gel, silica-alumina gel, activated carbon, activated alumina, calcium oxide, and combinations thereof. Suitable alkali metal alumino-silicate molecular sieves include, e.g., calcium, potassium and sodium alkali metal alumino silicates.

Useful molecular sieves are commercially available under the trade designations MOLSIV ADSORBENT TYPE 13X, 3A, 4A and 5A, all of which are available from UOP (Illinois), and PURMOL 3A from Zeochem (Louisville, Ky.). Molecular sieves are also available from W.R. Grace (Maryland), and under the SILIPORITE NK30AP and 65XP trade designations from Atofina (Philadelphia, Pa.). The desiccating matrix composition preferably includes at least about 20% by weight, from about 20% by weight to about 80% by weight, from about 30% by weight to about 70% by weight, or even from about 50% by weight to about 60% by weight adsorbent.

The desiccant matrix composition preferably includes both an adsorbent capable of adsorbing moisture and an adsorbent capable of adsorbing volatile organic compounds; preferably the composition includes from about 20% by weight to about 70% by weight, or even from about 30% by weight to about 55% by weight of an adsorbent capable of adsorbing moisture, and no greater than about 25% by weight, or even from 3% by weight to 20% by weight, of an adsorbent capable of adsorbing volatile organic compounds. An adsorbent that is capable of removing both moisture and volatile organics, such as molecular sieve 13x, can be employed as part or all of the adsorbent of the composition. A preferred adsorbent mixture includes from about 80% by weight to about 90% by weight of a desiccant such as molecular sieve 3A and from about 10% by weight to about 20% by weight of an adsorbent capable of adsorbing organic vapor and moisture, such as molecular sieve 13x.

The composition can optionally include fine particulate fillers including, e.g., calcium carbonate. Such fillers preferably have an average particle size of no greater than 0.1 micron. Suitable fillers include calcium carbonate fillers including, e.g., ULTRAPFLEX calcium carbonate which is available from Specialty Minerals (New York, N.Y.) which can be employed at levels no greater than about 10% by weight, or even less than about 5%.

The composition may include other additives including, e.g., antioxidants, ultraviolet light stabilizers, thermal stabilizers, pigments, and adhesion promoters.

The desiccant matrix composition can be applied at room temperature using any suitable dispensing technique including, e.g., extruding and pumping.

The desiccant matrix composition is useful in a variety of constructions including, e.g., insulating glass assemblies. Various useful insulating glass assembly configurations include integrated multipane window units, insulating glass units and sash assemblies. Suitable insulating glass assemblies, methods of making insulating glass assemblies, and spacing structures are described in various patents including, e.g., U.S. Pat. No. 5,653,073 (Palmer), U.S. Pat. No. 6,055, 783 (Guhl et al.), U.S. Pat. No. 6,286,288 (France), U.S. Pat.

No. 6,401,428 (Glover et al.), U.S. Pat. No. 5,177,916 (Misera), U.S. Pat. No. 6,223,414B1 (Hodek) U.S. Pat. No. 5,531,047 (Leopold et al.), and U.S. Pat. No. 5,313,761 (Leopold). Useful spacing structures are made from a variety of materials including, e.g., metal, polymer (e.g., polyvinyl chloride), composite, and combinations thereof. The spacing structure can be integral with a frame of the insulating glass assembly. The spacing structure can also be separate from the frame as in insulating glass units.

With respect to insulating glass assemblies, the desiccant matrix composition is preferably applied to a channel or a surface on a spacing structure. The desiccant matrix composition can be applied to the bottom surface, the sides of or can completely fill a channel such that the desiccant matrix it is level with, or extends above, the walls that define the channel.

Useful insulating glass assemblies can be constructed to include a sufficient amount of desiccant matrix composition to provide a functional insulating glass assembly. Preferably insulating glass assemblies are constructed to include desiccating matrix composition in an amount sufficient such that, when tested according to ASTM E774-88 entitled, "Standard Specification for Sealed Insulating Glass Units," in conjunction with ASTM E773-97 entitled, "Standard Test Method for Accelerated Weathering of Sealed Insulating Glass Units," hereinafter referred to as "ASTM E774/773," the assembly passes the Class C performance requirements, the Class CB performance requirements, or even the Class CBA performance requirements. The desiccating matrix composition can be used in the construction of insulating glass assemblies that, when tested according to ASTM E1887-97 entitled, "Standard Test Method for Fog Determination," are free of visible fog.

The insulating glass assemblies can also include other components such as a separate vapor barrier. Vapor barriers include films, e.g., metal foil films and polymer films, polymer compositions and combinations thereof. Vapor barriers are described, e.g., in U.S. Pat. Nos. 6,463,706 (Guhl) and 6,401,428 (Glover et al.). The vapor barrier can include adsorbent.

The invention will now be described by way of the following examples.

EXAMPLES

Test Procedures

Test procedures used in the examples include the following.

Flow Rate Test Method

Flow rate is determined by measuring the time (in seconds) required for 20 grams of sample to pass through a 0.104 inch orifice of a Castor Severs Rheometer that has been configured according to ASTM D-1823 under a pressure of 80 psi.

A flowmeter is connected to an air supply such that the line pressure is from 10 psi to 20 psi greater than the line pressure specified for the test (i.e., from 90 psi to 100 psi) until the flowmeter gauge stabilizes at the test pressure, i.e., 80 psi. A weighing pan is placed in the center of the balance about three inches under the orifice of the rheometer. The balance is tared with the weighing pan in place. The sample temperature is adjusted to room temperature (i.e., from 22° C. to 25° C.). The cylindrical cup is filled to ½ inch from the top and tapped sharply to avoid air pocket formation. The flowmeter piston disc or follower plate on the sample surface. The filled cup is then placed on the flowmeter. The air valve to the piston is opened and 5 grams of sample are extruded onto the weigh pan positioned on the balance. Then the air valve to the piston is turned off and the sample is discarded. A clean weigh pan is placed on the balance and the balance is tared again. The air valve is opened to the piston and another portion of sample is extruded. A stopwach is started when the sample reaches the weigh pan and stopped when the balance indicates 20 g. The piston valve is then closed and the time in seconds is recorded as the flow rate of the material.

Slump Test Method

Slump is determined according to ASTM D2202-88 with the exception that slump is measured after 5 minutes at 77° F. The sample composition and the test jig are allowed to equilibrate at 77° F.+/−1° F. (25° C.+/−0.5° C.). The test jig is then placed, with front face upward and the plunger depressed to the limit of its travel (9 mm), the cavity on the front face of the jig is filled with sample composition. The cavity is filled with one stroke of the plastic scraper held at an angle of about 45 degrees to the face of the jig, while avoiding forming air bubbles in the cavity. The area around the cavity is cleaned of excess sample. The jig is turned to a vertical position and placed on a level surface while avoiding vibration. The jig is placed on its end and the plunger is slowly pushed to the full length of its travel such that a solid cylinder of sample measuring 3.81 cm (1 to 1½") in diameter×0.125+/−0.001 inch high protrudes from the face of the test jig. A reading is taken after five to six minutes to nearest 0.01 inch of maximum point of flow of the compound.

Slump at 190° F.

Slump at 190° F. is determined by extruding a bead of composition, 0.25 in. wide×3 in. long×0.25 in. thick, onto a piece of flat aluminum stock. The test sample is then suspended vertically in a protected environment and conditioned at 190° F. for a predetermined period. The samples are then removed and observed to determine the distance traveled by the sample from its original position. The distance traveled is recorded to the nearest 0.1 inch.

Liquid Migration Test Method

Liquid migration is determined by extruding a bead of composition, 0.25 in. wide×3 in. long×0.25 in. thick, onto a piece of flat aluminum stock. The test sample is then suspended vertically in a protected environment. The samples are observed for migration of liquid. The distance a liquid has migrated out of the sample and down the stock is measured from the end of the sample to the farthest point of the migrated liquid.

Example 1

A desiccant matrix is prepared by combining, in a lab size mixer equipped with a dispersing blade and capable of heating to 200° F., 296 grams JAYFLEX ditridecylphthalate plasticizer (ExxonMobil, Houston, Tex.), 400 grams POLY BD R45HT hydroxy terminated polybutadiene (Elf Atochem North America, Inc., Philadelphia, Pa.), 4 grams TINUVIN UV stabilizer (Ciba Specialty Chemicals Inc., Terrytown, N.Y.), 10 grams IRGANOX 1010 antioxidant (Ciba Specialty Chemicals), 0.2 grams MONARCH 120 carbon black (Cabot Corp., Apharatta, Ga.), 20 grams TIPURE titanium dioxide (DuPont, Wilmington, Del.), 20 grams CLAYTONE organic treated clay (Southern Clay, Gonzales, Tex.), 20 grams aluminum stearate and 60 grams calcium carbonate. The mixture is mixed under full vacuum with heat (about 220° F.) for 30 minutes at low speed. To this mixture is then added 938 g type 3A molecular sieve and 232 g type 13X molecular sieve. The composition is then mixed under vacuum for one to two hours with the disperser at high speed.

Example 2

A desiccant matrix is prepared by combining, in a lab size mixer equipped with a dispersing blade and capable of heating to 200 F, 276 grams JAYFLEX ditridecylphthalate plasticizer, 400 grams POLY BD R45HT hydroxy terminated polybutadiene, 4 grams TINUVIN UV stabilizer, 10 grams IRGANOX 1010 antioxidant (Ciba Specialty Chemicals), 0.2 grams MONARCH 120 carbon black, 20 grams TIPURE titanium dioxide, 30 grams CLAYTONE organic treated clay, 10 grams aluminum stearate and 80 grams calcium carbonate. The mixture is then mixed under vacuum with heat for 30 minutes at low speed. To this mixture is then added 938 grams of Type 3A molecular sieve and 232 grams Type 13X molecular sieve and mixed under vacuum for one to two hours with the disperser at high speed After cooling the compositions of Examples 1 and 2 to room temperature (i.e., about 75° F.) (overnight in the lab) the viscosity of the composition is determined according to the Flow Rate test method. The slump of the example compositions is tested at room temperature after two months and one year, and after conditioning at 190° F. for one week and two weeks. The liquid migration is measured after one month, three months, 6 months and one year of conditioning at room temperature. The expected results are reported in Table 1.

TABLE 1

Expected Results

| | SLUMP | | | | | | | |
|---|---|---|---|---|---|---|---|---|
| | Room Temperature (after 5 | 190° F. | | Flow Rate (sec/20 | Liquid Migration (mm) | | | |
| Example | minutes) | 1 week | 2 weeks | gram) | 1 Month | 3 Months | 6 Months | 1 year |
| 1 | <0.1 in | <0.1 in | <0.1 in | 160 | <2 mm | <2 mm | <2 mm | <2 mm |
| 2 | <0.05 in | <0.1 in | <0.1 in | 200 | <2 mm | <2 mm | <2 mm | <2 mm |

Other embodiments are within the claims.

What is claimed is:

1. A desiccating matrix composition comprising:
   hydroxy-functional polybutadiene;
   plasticizer;
   metal stearate;
   organic-modified clay; and
   from 20% by weight to 80% by weight adsorbent.

2. The desiccating matrix composition of claim 1, wherein said composition exhibits a flow rate of from about 80 seconds to about 300 seconds when determined according to the Flow Rate Test Method.

3. The composition of claim 1, comprising
   from about 5% by weight to about 40% by weight said hydroxy-functional polybutadiene;
   from about 5% by weight to about 30% by weight said plasticizer; and
   from about 0.1% by weight to 3% by weight said metal stearate.

4. The composition of claim 1, comprising from about 0.1% by weight to about 3% by weight said clay.

5. The composition of claim 1, wherein said composition exhibits no greater than 1 centimeter of liquid migration at room temperature.

6. The composition of claim 1, wherein said composition is free of visible liquid migration.

7. The composition of claim 1, wherein said composition exhibits no greater than 0.25 inch of slump.

8. The composition of claim 1, wherein said composition exhibits no greater than 0.1 inch of slump.

9. The composition of claim 1, wherein said metal stearate is selected from the group consisting of lithium stearate, calcium stearate, zinc stearate, and combinations thereof.

10. The composition of claim 1, wherein said metal stearate comprises aluminum stearate.

11. The composition of claim 1, wherein said plasticizer comprises phthalate ester.

12. The composition of claim 1, wherein said plasticizer comprises trimellitate plasticizer.

13. The composition of claim 1, wherein said organic-modified clay comprises hydroxyl groups.

14. The composition of claim 1, further comprising calcium carbonate, pigment, antioxidant, ultraviolet light stabilizer, or a combination thereof.

15. The composition of claim 1, wherein said adsorbent particles are capable of adsorbing moisture, volatile organic compounds or a combination thereof.

16. An insulating glass assembly comprising:
    a spacing structure;
    a first pane of glass bonded to a first surface of said spacing structure;
    a second pane of glass bonded to said spacing structure; and
    the desiccant composition of claim 1 disposed on said spacing structure.

17. The insulating glass assembly of claim 16, wherein said insulating glass assembly is free of visible fog when tested according to ASTM E1887-97.

18. The insulating glass assembly of claim 16, wherein said insulating glass assembly passes the Class C performance requirements of ASTM E774/773.

19. The insulating glass assembly of claim 16, wherein said insulating glass assembly passes the Class CB performanance requirements of ASTM E774/773.

20. The insulating glass assembly of claim 16, wherein said insulating glass assembly passes the Class CBA performance requirements of ASTM E774/773.

21. A method of applying a desiccant matrix composition, said method comprising contacting a spacing structure with the desiccant matrix composition of claim 1 at a temperature from about 15° C. to about 35° C.

* * * * *